Oct. 1, 1946.　　　A. A. GRIFFITH　　　2,408,632
FLUID-SOLID CONTACT-SURFACE
Filed Aug. 12, 1943
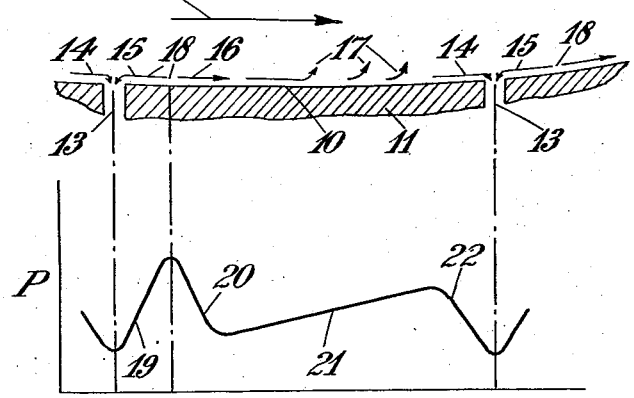
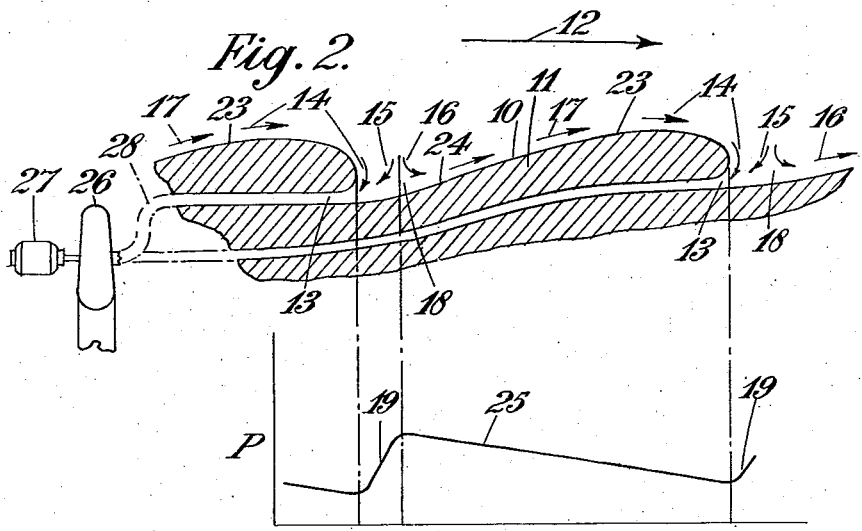
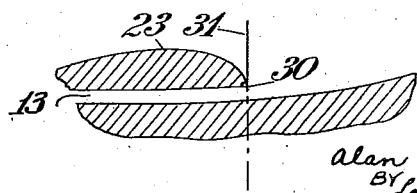
INVENTOR
Alan Arnold Griffith
BY Loyd Hall Sutton
ATTORNEY Patented Oct. 1, 1946

2,408,632

UNITED STATES PATENT OFFICE 2,408,632

FLUID-SOLID CONTACT SURFACE

Alan Arnold Griffith, Derby, England, assignor to Rolls-Royce Limited, Derby, England, a company of Great Britain Application August 12, 1943, Serial No. 498,414
In Great Britain August 25, 1942

5 Claims. (Cl. 244—40)

This invention relates to aeroplanes and other vehicles and also to pumps, compressors, turbines and like machines and ancillary appliances where, in the relative motion of a solid and a fluid, it is necessary for the proper functioning of the vehicle or machine that the fluid pressure on the surface of the solid shall increase in the general direction of motion of the fluid past the surface. A basic factor governing the design of such surfaces is that if such rise of pressure be too rapid, the flow will break away from the surface with consequent increase of drag or other loss. It is known that such a tendency, when it exists, may be mitigated by introducing into the surface a slot or slots, or the like, through which the fluid boundary layer may be sucked away by a pump or other device. When this is done there exists on the surface of the solid a stagnation point a short distance downstream from the slot. At this point the fluid further from the surface, just beyond the layer sucked away, is brought to rest on the surface, thereby generating the corresponding dynamic pressure. In general, therefore, there is a sharp rise of pressure from the slot to the stagnation point followed by a sharp but smaller fall and then a more gradual rise. The sharp rise from the slot to the stagnation point has no tendency to cause a breakaway because in this restricted region the direction of flow of the boundary layer is reversed, that is, it runs from the stagnation point to the slot. The tendency still exists, however, in the later, more gradual rise.

According to my invention, a fluid-solid boundary containing one or more suction slots or the like is so shaped that no rise of pressure occurs on the surface in the general direction of flow except in the interval between the slot, or each of them, and its associated stagnation point, where the boundary layer is locally reversed in direction. This may be done by providing that the surface curvature suddenly changes on passing across the slot, in the sense of being less convex to the fluid on the downstream side of the slot. In addition, there may be a sudden change of direction at the slot, in the sense to form a re-entrant angle with respect to the solid. Known methods of calculation, used for determining the shapes of the surfaces having prescribed pressure distributions, may be used for ascertaining the precise shapes which are suitable for carrying out this invention. In general, it is found that the surface is convex to the fluid upstream of the slot and concave downstream, with the greatest arithmetical curvature at the slot in each case.

According to another feature of my invention, the shape of the surface is so chosen that there occurs a suitable slow fall of pressure in the direction of flow, both upstream of the slot and downstream from the stagnation point associated with the slot, so that with motion at large Reynolds' number the boundary layer is in known manner maintained in the laminar condition, with consequent benefit in decreased skin friction.

According to a further feature of the invention, the slot extends into the solid in a direction tangential to the less convex portion of the surface at the entrance to the slot so that there is no sharp change of direction between the slot and its stagnation point.

An embodiment of the present invention will now be described, by way of example only, with reference to the accompanying drawing, in which:

Figure 1 shows diagrammatically the known arrangement of solid-fluid boundary and the pressure gradients occurring along a boundary;

Figure 2 is a diagrammatic section through a solid-fluid boundary according to this invention and shows the pressure gradient along this boundary, and Figure 3 is a diagrammatic section through a modification of the fluid-solid boundary shown in Figure 2.

Like reference numerals indicate like parts in the figures of the drawing.

As shown in Figure 1 air or other fluid is flowing over the surface 10 of a solid 11 in the direction shown by the arrow 12. Slots 13 (the size of which is greatly exaggerated in the drawing) are formed in the surface 10 and suction is applied to these slots by suitable means so as to suck away a part or the whole of the boundary layer of the fluid adjacent the surface 10. The suction causes the boundary layer to flow in the manner indicated by the arrows 14, 15, 16 and 17. A short distance downstream of each slot 13 there is a stagnation point 18 at which the fluid further from the surface, just beyond the layer sucked away, is brought to rest on the surface. The direction of flow of the boundary layer is locally reversed, as indicated by the arrow 15, between each slot 13 and the adjacent stagnation point downstream.

The pressure curve in Figure 1 shows the pressure on the surface in the plane of the section as opposed to lift, or reduction in pressure, as is conventional. The pressure gradient comprises a sharp rise 19 from each slot 13 to the adjacent stagnation point 18 followed by a sharp fall 20 and a more gradual rise 21 to a point just upstream of the next slot 13 when the pressure will fall as shown at 22 to a value dependent upon the pressure produced by the suction device in the next slot 13. The rise 21 tends to cause the boundary layer to break away as indicated by the arrows 17 with consequent increase of drag or other loss.

The surface 10 shown in Figure 2 is shaped in accordance with this invention so as to be convex to the fluid at 23 upstream of each slot 13 and concave to the fluid at 24 downstream of the slot. The arithmetical curvature of both the concave and the convex portions of the surface are greatest near the slot. The curves 23 and 24 are discontinuous at the slot, so that there is a sudden change of direction at the slot to form a reentrant angle. The curve 24 merges with one wall of the slot so that there is no sharp change of direction between the stagnation point and the slot. The curve 23, upstream of the slot, is rounded to merge with the other surface of the slot.

The rise 19 in pressure between each slot and its adjacent stagnation point 18 will occur as with the existing arrangement, see the curve in Figure 2 which is drawn on the same convention as that in Figure 1, but the sharp fall 20 and subsequent rise 21 are replaced by a gradual slow fall 25 in pressure to the next slot 13 downstream. Any tendency for the boundary layer to break away is thus completely eliminated.

Any known form of pump, fan, ejector, venturi or the like may be used to suck away the boundary fluid through the slots and this means is shown in Figure 2 as comprising a centrifugal fan 26 driven by a suitable prime-mover 27 and having its intake connected by a passage 28 to the slots 13.

In the modification shown in Figure 3 the slot 13 is made wider than is necessary to admit the boundary layer and the curve 23 upstream of the slot ends in a sharp edge 30, the tangent 31 to the curve 23 at the edge 30 being normal to the direction of the slot.

It is to be understood that the above reference to sucking away the boundary layer includes the removal of the whole or a part thereof; the pressure produced by the suction device must be less than the pressure existing at the slot in order to remove the fluid. The suction pressure determines the pressure which obtains at the stagnation point downstream from the slot, which may be equal to or less than the Pitot pressure according as the boundary layer is wholly or partly removed. No additional advantage is obtained by removing a layer of greater thickness than the boundary layer.

It will also be understood that surfaces of the kind to which this invention relates are usually curved in the direction of flow of the fluid over them, as shown in Figure 1, and that this general curvature across the surface is not, in general, uniform but changes along the surface. The changes in curvature required by the present invention are additional to such general progressive changes of curvature and references in the appended claims to changes of curvature of the surface mean changes other than any progressive change in general mean curvature that the surface may have.

My invention is of advantage in that the ill effects of contrary pressure gradients which usually arise in the relative motion of solids and fluids, are not merely mitigated but eliminated altogether. The long slender shapes which have hitherto been an aerodynamic necessity are no longer needed.

I claim:

1. A solid having a surface over which fluid flows, which is provided with at least one suction slot and which surface is convex to the fluid upstream of the slot and is concave to the fluid downstream of the slot with the greatest arithmetical curvature at the slot in each case, and means for sucking some of the fluid through the slot.

2. A solid having a surface over which fluid flows, which is provided with at least one suction slot, and which surface is convex to the fluid upstream of the slot and concave to the fluid downstream of the slot, with the greatest arithmetical curvature at the slot in each case and with the curvatures on either side of the slot discontinuous to form a re-entrant angle with respect to the solid, and means for sucking some of the fluid through the slot.

3. A solid having a surface over which fluid flows, which surface is provided with at least one suction slot and which surface is convex to the fluid upstream of the slot and concave to the fluid downstream of the slot, and which slot extends into the solid in a direction tangential to the concave portion of the surface at the entrance to the slot; and means for sucking some of the fluid through the slot.

4. A solid having a surface over which fluid flows and which has a convex portion and a concave portion, the concave portion being downstream of the convex portion, and which is formed with a slot between the said portions and extending into the solid in a direction tangential to the concave portion of the surface at the entrance to the slot, with one wall merging with the concave portion and the other wall merging with the convex portion of the surface through a smooth curve of small radius; and means for sucking some of the fluid through the slot.

5. A solid having a surface over which fluid flows and which has a convex portion and a concave portion, the concave portion being downstream of the convex portion, and which is formed with a slot between the said portions and extending into the solid in a direction tangential to the concave portion of the surface at the entrance to the slot with one wall merging with the concave portion and the other joining the convex portion of the surface at a sharp corner along a line where the tangent at the surface is normal to the direction of the slot, and means for sucking some of the fluid through the slot.

ALAN ARNOLD GRIFFITH.